United States Patent [19]
Balm

[11] 4,058,795
[45] Nov. 15, 1977

[54] METHOD AND APPARATUS FOR CONTEXT-AIDED RECOGNITION

[75] Inventor: Gerald John Balm, Rochester, Minn.

[73] Assignee: International Business Machines Corporation, Armonk, N.Y.

[21] Appl. No.: 535,401

[22] Filed: Dec. 23, 1974

Related U.S. Application Data

[63] Continuation of Ser. No. 294,706, Oct. 3, 1972, abandoned.

[51] Int. Cl.² .............................................. G06K 9/00
[52] U.S. Cl. ......................................... 340/146.3 WD
[58] Field of Search .......... 340/146.3 MA, 146.3 AQ, 340/146.3 Q, 146.3 WD, 146.3 ED, 146.3 R, 172.5

[56] References Cited

U.S. PATENT DOCUMENTS

| | | | |
|---|---|---|---|
| 3,182,290 | 5/1965 | Rabinow | 340/146.3 AQ |
| 3,188,609 | 6/1965 | Harmon et al. | 340/146.3 WD |
| 3,259,883 | 7/1966 | Rabinow et al. | 340/146.3 WD |
| 3,267,439 | 8/1966 | Bonner | 340/146.3 WD |
| 3,492,646 | 1/1970 | Bene et al. | 340/146.3 Q |
| 3,533,069 | 10/1970 | Garry | 340/146.3 WD |
| 3,537,076 | 10/1970 | Damerau | 340/172.5 |
| 3,560,927 | 2/1971 | Rabinow et al. | 340/146.3 MA |
| 3,789,361 | 1/1974 | Cortez | 340/146.3 MA |

Primary Examiner—Leo H. Boudreau

[57] ABSTRACT

A character-recognition unit or other input device provides a sequence of input characters. A questionable identification of one of the input characters is resolved by considering surrounding characters by a modified N-gram technique. The context characters are each translated into one of a small number of reduced codes each representing a subset of the alphabet to be recognized. The reduced codes are combined to produce a context code which indicates a set of categories containing the correct identification for the questionable input character. A list of confusion codes specifies a number of possibly correct identifications for one of the input characters. One of the codes in the confusion list is selected by the context code as the correct identification for the questionable character.

8 Claims, 9 Drawing Figures

METHOD AND APPARATUS FOR CONTEXT-AIDED RECOGNITION

This is a continuation of application Ser. No. 294,706 filed Oct. 3, 1972, now abandoned.

BACKGROUND OF THE INVENTION

The present invention relates to electrical communication, and more particularly to a method and apparatus for improving the information content of data by contextual analysis. The invention finds utility in diverse fields, such as digital data transmission, text correction, language translation and the recognition of speech and graphical patterns. The following description, however, will focus on one area of major applicability, that of character recognition.

Most conventional character-recognition systems recognize one input character pattern or image at a time, without considering any information relating to any surrounding character patterns. This compartmentalization of the recognition process presently appears to be the major limitation upon the ability of machines to read degraded and poorly segmented characters. The reading of cursive script by either machines or people appears to be impossible on a character-by-character basis.

Contextual analysis has been successfully used in connection with conventional character-recognition machines. In the "dictonary look-up" technique, a sequence of individually recognized characters is applied to a table containing entries against which the input sequence is matched. The table entry having the closest match to the input sequence is then chosen as the correct output sequence. This technique, however, requires extremely large dictionary tables and a large amount of time to search the tables. The dictionary is difficult to design and becomes considerably less complete as the size of the input sequence grows. Therefore, its use has been limited to special applications involving relatively small numbers of relatively short words.

A related technique employs sequences called "N-grams". In this method, a fixed number of characters surrounding the unknown character is applied to a table of possible combinations on input characters; the table then outputs that character which has the highest probability of representing the unknown character. The N-grams may be either fixed or sliding. A fixed pentagram, for example, may consider the two characters on either side of the unknown (fifth) character in order to identify the unknown character. The sliding-trigram method, on the other hand, considers first the two characters to the left of the unknown (third) character in order to make a first tentative identification of the unknown character; a second trigram then looks at the character on either side of the unknown character and makes a second estimate of its identity, and a third trigram considers the two characters to the right of the unknown character to make a third provisional identification. The final identification of the unknown character is then made from the three provisional identifications according to a predetermined set of rules. Although N-gram analysis is known to be a powerful tool, the prohibitive size of the required tables renders it impractical for all but a small number of specialized uses. A single fixed pentagram for 27 characters (26 letters and "space"), for example, requires a table having more than fourteen million entries.

SUMMARY OF THE INVENTION

The present invention proposes to eliminate the difficulties which has previously been considered to be inherent in the N-gram analysis technique, without significantly degrading its generality and accuracy.

Basically, the invention involves the conversion of input character codes into reduced codes which are used to generate a further reduced code, which in turn is used to select one of a number of confusion codes which may represent the identity of one of the input character. Each of the input codes represents one of the possible categories into which an input character may be classified, such as the letter "A", the letter "B", the letter "C", the numeral "1", the numeral "2", the blank space, the reject symbol, and so forth. Each of the reduced codes, however, represents a set of the above categories, such as, for instance, the set of all vowels, a first set of consonants, a second set of consonants, the blank space by itself, and so forth. The chief advantage of the invention derives from the fact that the number of sets is substantially smaller than the number of categories. The confusion code represents one of the above-named categories. The confusion codes are so named because they specify characters which are commonly confused with certain other characters. The confusion codes may also be termed "candidate codes", since they represent candidates for the input character.

The invention also proposes to reduce the possibility of errors in powerful context-analysis methods by cascading them with simpler but more reliable context methods. A small-word dictionary, e.g., is not as powerful as an N-gram, but it is more reliable within its limited scope of applicability. Therefore the present invention includes the interconnection of context techniques, as well as certain techniques themselves.

Although other implementations are possible, the concepts of the present inventon are preferably practiced either as special-purpose logic circuits, or by programming a general-purpose digital computer.

A primary object of the present invention, therefore, is to provide an improved system and method for processing input codes by contextual analysis. Other objects of the invention include reducing the expense, increasing the speed and enhancing the flexibility of contextual analysis over a wide range of applications. Further objects, advantages and features of the invention will become apparent to those skilled in the applicable arts from the following detailed description of several illustrative embodiments, taken in conjunction with the accompanying drawings.

DETAILED DESCRIPTION

Context-aided recognition is a potentially powerful method of enhancing the capabilities of character-recognition machines. Although dictionary look-up techniques have been successfully used in commercial machines, their application has been limited to small words or words from specialized vocabularies, such as street names or surnames. The so called "N-grams" technique has thus far not been widely used commercially, because of the enormous size of the required tables. As shown in Table I, a trigram (N=3) requires a table having almost twenty thousand entries, while the more useful pentagram (N=5) requires more than fourteen million entries. At the same time however, the larger tables have a rapidly decreasing efficiency. In the trigram using twenty-seven character categories, for instance, Table I shows that less than one third of the possible combinations of the three letters are found in the English language. The efficiency of the pentagram is unknown, but is probably in a range of four percent to seven percent. Therefore, almost all of the entries in a pentagram table will contain extremely improbable combinations. Heretofore, the only kown method of reducing the storage requirements and increasing the efficiency of the N-gram technique has been to reduce the number N of characters to be used in identifying the unknown character.

TABLE I

|  | N = 2 | N = 3 | N = 4 | N = 5 |
|---|---|---|---|---|
| C = 27 | 729 | 19,683 | 531,441 | 14,348,907 |
|  | (46%) | (31%) | (12%) | (?%) |
| R = 6 | 36 | 216 | 1,296 | 7,776 |
| R = 5 | 25 | 125 | 625 | 3,125 |
| R = 4 | 16 | 64 | 256 | 1,024 |

The present invention, on the other hand, proposes to allow the number N to remain large, while reducing the number of possible categories. Table I shows, for instance, that if the number of acceptable classes is restricted to R=4, then the number of possible combinations for N=5 is comparable to the number of combinations of 27 categories for N=2. Even for six entities R=6, the number of combinations for N=5 is less than half of the corresponding number for 27 categories with N=3. This reduction in the number of possible categories is performed by coding or translating each of the input codes, having, e.g., one of 27 possible categories, into one of a number of reduced codes representing a substantially smaller number of sets of categories. Table II shows one assignment of the 27 character categories into six sets. It should be noted at this point that not all of the sets need contain more than one category in this example, the "blank" is the only character in the sixth set. Table II does not include a possible "reject" set or symbol. Information theory requires that the sets have an equal probability of occurrence, for maximum efficiency. Table II shows that this condition is substantially met by the given assignment.

TABLE II

| Set | Categories | Probability |
|---|---|---|
| 1 | G K M P T V W | 16.6% |
| 2 | C D H J Q R Z | 15.5% |
| 3 | B F L N S X | 17.3% |
| 4 | E O Y | 18.9% |
| 5 | A I U | 13.9% |
| 6 | "blank" | 18.7% |

The coding of context characters into a small number of sets does not, however, solve the problem. In general, it will be difficult to assign a specific character code to almost any of the possible combinations of reduced-set codes. That is, for example, it cannot be said that any sequence of sets such as "Set #3, x, Set #1" (where x represents the unknown character) can specify with any certainty that the unknown character is an "E".

It has been discovered, however, that such a sequence of sets is usually sufficient to specify the set of which the unknown character is a member. Accordingly, the present invention also selects a confusion list for each unknown character. This list of confusion characters or candidate characters sets forth the codes of those characters whose appearance are similar to that of the unknown character. A confusion list may be designed heuristically for each character category. Table III shows an example of such predetermined lists.

TABLE III

```
A B C D E F G H I J K L M N O P Q R S T U V W X Y Z b
H D G B Z - C A T - H C N H D D 0 A - I O U N K T E -
R - L O - - - K Z - R R - M Q R - K - J V - - Y X I -
- - - P - - - M - - X - - R U - - P - Y - - - - - - -
- - - - - - - N - - - - - W - - - - - - - - - - - - -
```

The use of fixed lists has the advantage that their members may be selected so that each input character has no more than one confusion character within each reduced set. Several lists in Table III contain pairs of confusion characters belonging to a single one of the sets defined in Table II. It will usually be necessary to delete one character of each pair from these lists.

Alternatively, a confusion list may be supplied ad hoc for each individual input character. Therefore, instead of employing fixed confusion lists, a recognition system of the type shown in U.S. Pat. Nos. 3,492,646 or 3,182,290 may be used to generate personalized confusion lists for each character which is actually detected on input document 110, FIG. 1. As will be described hereinafter, precautions may be taken for this type of system to resolve those situations in which more than one confusion character lies in the same reduced set.

RECOGNITION SYSTEM 100

Figure 1:
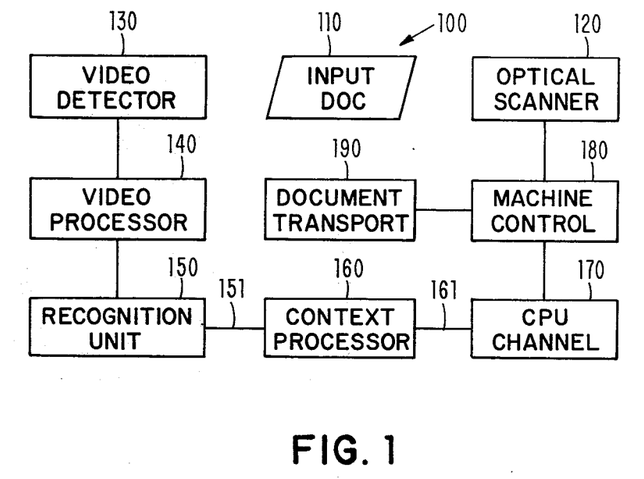
FIG. 1 shows a representative system in which a context processor according to the invention may be employed.

FIG. 1 shows a representative system 100 in which the present invention finds utility. System 100 scans a character-bearing document 110 with any type of conventional scanner 120 to produce a video signal in detector 130. Video processor 140 performs conventional preliminary functions, such as storage of an electronic image of the document characters, height and width registration and normalization, and contrast enhancement.

Recognition unit 150 may be any one of a number of conventional devices for converting a character image from processor 140 into a code identifying the character. That is, the purpose of unit 150 is to produce a code in a standard format (such as EBCDIC or ASCII) which identifies the input pattern from document 110 as belonging to one of a plurality of possible categories which unit 150 is designed to recognize; i.e., its alphabet. The number and names of these categories of course depend upon the specific application. Examples include the letters A, B, C, ..., Z of the Roman alphabet, the Arabic numerals 0, 1, 2, ..., 9, certain punctuation marks, special symbols, and so forth. It is also convenient in the present system to consider the blank space to be a character category represented by a code on line 151, and to categorize all unidentifiable characters on document 110 with a "reject" code or symbol.

In any recognition system, there is a trade-off between the reject rate and the substitution rate: a system which is designed to reject very few characters is more likely to substitute input characters by producing a code for an incorrect category, and a system which is designed to minimize such substitution errors thereby increases the number of characters which are rejected as unidentifiable. In system 100, any clue to the possible identity of an input character is helpful. Therefore, although recognition unit 150 is preferably designed, using conventional techniques, to have a low substitution rate, it should preferably produce a non-confident best guess (marked as such) rather than merely a "reject" symbol. In two implementations of the context processor 160 to be described hereinbelow, recognition unit 150 provides a list of candidate categories on line 151 rather than a single best guess; a unit which is capable of providing such a cadidate list is shown, for example, in U.S. Pat. No. 3,492,646. Several implementations of context processor 160 require marker flags identifying non-confident identifications of their associated characters. Such flags may be derived by conventional means. In the recognition unit shown in U.S. Pat. No. 3,492,646, for instance, the "conflict" signal may be used as a marker flag. In a system such as that shown in co-owned U.S. Pat. application Ser. No. 95,676 (P. H. Howard), a distance code may be thresholded at a predetermined value and all distances above this value may be made to generate a marker flag.

Context processor 160 receives a sequence of character codes on line 151 and generates output character codes on line 161. While recognition unit 150 identifies an input character solely from the pattern representing that one character, context processor 160 employs the identifications of several characters simultaneously in order to identify, or to enhance the identification of, one of the characters, which may be termed the "unknown character". The characters used in this process are preferably, but not necessarily, contiguous to one another; they may or may not surround the unknown character, and the same character may be used to identify several characters.

A context processor 160 according to the invention may be made to recognize error conditions which it cannot confidently handle, and may be inhibited from modifying any confident decisions made by recognition unit 150. Postprocessor 160 may be made iterative by returning the corrected character to the input, and it may be pipelined or cascaded with other contextual techniques to improve its capabilities. The disclosed concepts may be implemented either in hardware or computer programming, as desired. Examples of both varieties are described hereinbelow.

Output line 161 couples the output character code produced by processor 160 to a utilization device such as CPU channel 170. Channel 170 is also here shown to both receive and transmit data for conventional machine-control circuits 180, which may control scanner 120 and a conventional document transport 190.

System 100 is a somewhat arbitrary form of recognition system. Many other types of character and pattern recognition systems may also be enhanced by the present invention. The invention may also be employed in systems which are not normally considered to perform recognition functions, such as text-editing systems and communications systems.

PROCESSOR 200

Figure 2:
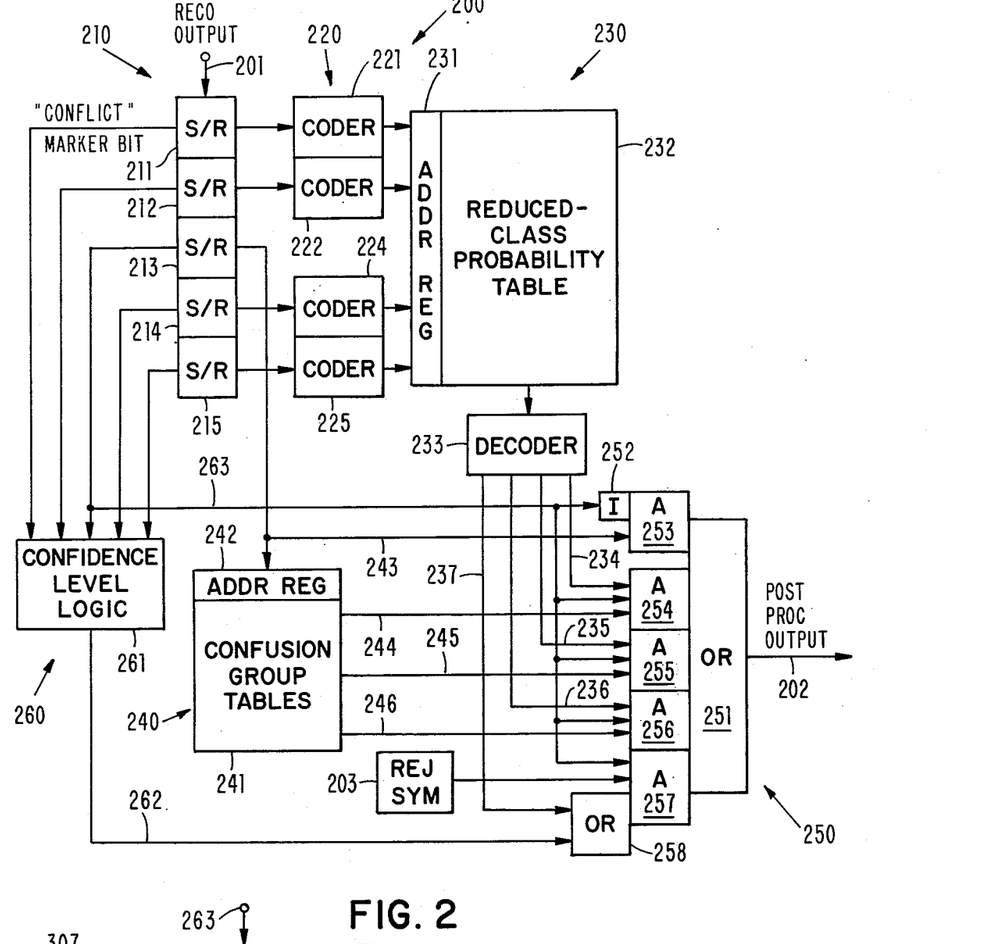
FIG. 2 shows one form of context processor according to the invention.

FIG. 2 shows a processor 200 useful in block 160 of FIG. 1. Input codes for successive characters are transmitted via line 151 to line 201, and are received in consecutive stages 211–215 of a shift register 210. The input character whose identity is to be established is the central character of a fixed pentagram, and is contained in stage 213. The context characters employed are the four characters on either side, which are contained in stages 211, 212, 214 and 215. Coding means 220 translates the character codes into the reduced codes for the proper sets of categories. The individual coders 221, 222, 224 and 225 may be conventional logic circuits or read-only stores. Typical sets are shown in Table II, above.

The coder outputs are then catenated in the address register of context-code generator 230. Although not shown in FIG. 2, the tentatively identified character in stage 213 could also be coded and entered into register 231. The address formed in register 231 accesses one entry of a table 232 containing a reduced code representing the most probable set to which the input character category in stage 213 belongs. This code is read out as the context code to decoder 233, where it energizes one of the lines 234–237. Only four line are shown, for clarity of explanation. The categories in the sets represented by the context code need not be the same as those in the sets generated by coding means 220. For the present purposes, however, it will be assumed that the character categories in each set applied to register 231 are the same as those in each context-code set. If no character category is possible for a given combination of sets, the table entry for that combination may contain a code specifying a "reject" set.

Means 240 produces a fixed confusion list for the character in stage 213. Means 240 is preferably a read-only store or table 241 having an address register 242 coupled to stage 213, so that the input character code specifies one entry of the table. The contents of the addressed entry are emitted on lines 244–246. The contents of table 241 are arranged such that the confusion-character codes on lines 244–246 represent categories which are members of the sets specified by lines 234–236, respectively. Since some character categories do not have confusion characters in all possible sets, the missing items in the confusion lists may conveniently be specified as the code for the "reject" symbol.

Gating means 250 matches the set specified by context-code generator 230 with one of the codes in the confusion list produced by means 240. Disregarding line 263 for the moment, the set from table 232 which energizes line 234 enables AND gate 254 to pass the confusion code on line 244 through OR 251 to output line 202. Similarly, the energization of line 235 enables AND 255 to pass the code on line 245 to output line 202, and line 236 causes AND 256 to transmit the code on line 246 to the output. When line 237 indicates that none of the reduced sets can correctly include the input character in stage 213, OR 258 enables AND 257 to transmit a reject-symbol code from unit 203 through OR 251 to output line 202.

As stated earlier, the character codes arriving from recognition unit 150, FIG. 1, may have associated marker bits or flags to indicate nonconfident decisions. These bits, which are also stored in the various stages of shift register 210, are used for two purposes by confidence-level means 260. If recognition unit 150 is able to arrive at a confident identification of the input character in stage 213, there is no point in processing this decision through system 200. Accordingly, the absence of a marker bit on line 263 enables AND 253, through inverter 252, to pass the code in stage 213 through OR 251 to the output line 202. The absence of a bit on line 263 also enables AND's 254–257 for confident decisions.

The other function of means 260 is to reduce the likelihood of incorrect results when the sequence of characters in register 210 cannot be relied upon for contextual processing. There is also no point in using contextual processing when the context itself is unreliable. Logic 261 energizes line 262 when this condition occurs; OR 258 then causes AND 257 and OR 251 to pass the reject-symbol code to output 202. AND's 254–256 need not be disabled if the reject code is chosen (e.g., hexadecimal "FF") so that it will overwrite any other code which may be selected by gating means 250. Logic 261 may execute any of a number of logic functions, although it would of course be counterproductive to allow a reject when the input character in stage 213 has been confidently recognized, regardless of the confidence of the context characters in the other stages. Logic 261 may, for example, produce a signal on line 262 when any two of the context characters carry marker bits, or, alternatively, when either of the characters in stages 212 and 214 carries a marker bit. Although called "bits", the markers may have more than two possible values, to specify different degrees of confidence.

From the preceding discussion, it will be noted that a reject on line 202 may arise in three different ways. First, an entry in table 232 may energize line 237 to indicate that no reduced set can be assigned to the character in stage 213, given the particular sequence of context-character sets in the remaining stages of shift register 210. Because of the increased efficiency attained by using a small number of sets, however, this situation will be infrequent. Alternatively, a reject may arise by the selection of one of the lines 244–246 when the character in stage 213 is unlikely to be confused with any character in the set read out of table 232. More elaborate techniques, such as an indication of first-choice and second-choice sets in table 232, may be coupled to additional gating circuitry (not shown) if the situation warrants the additional complexity. Finally, the entire sequence of characters in the pentagram may be sufficiently error-prone that table 232 is likely to yield incorrect results. This situation may be alleviated to some extent by iterative techniques, such as feeding output line 202 back into stage 213, or cascading a number of context-processing units.

DICTIONARY 300

Figure 3:
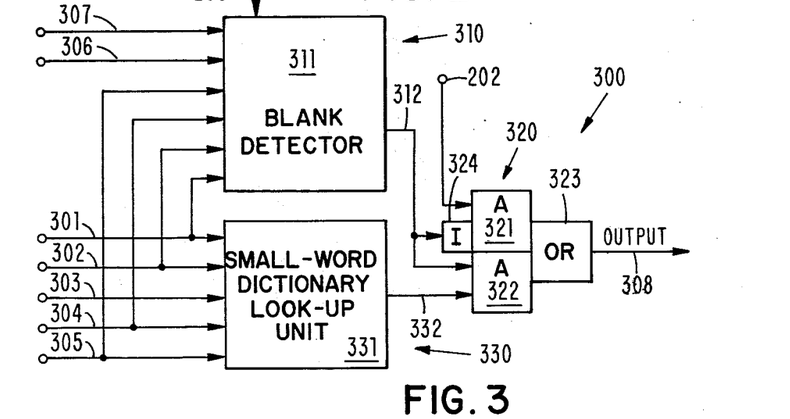
FIG. 3 illustrates an auxiliary dictionary look-up unit for the invention.

Output line 202 of processor 200 may be connected directly to line 161 of FIG. 1, or it may be coupled to another contextual processing unit. FIG. 3 shows another such unit 300. By reducing the number of sets into which the characters in register 210 are coded, processor 200 purposely destroys some information as to the context characters in order to allow the consideration of a larger number of these characters. But, when the relevant context of the input character in stage 213 is small, it is feasible to consider its full details. Blank-detection means 310 therefore contains logic 311 which senses the inclusion of the input character in a "small word", i.e., one having a maximum of five letters. To this end, lines 301–305 are connected to respective ones of the register stages 211–215, FIG. 2. Lines 306 and 307 are connected to additional shift-register stages preceding stage 211 and following stage 215 (not shown). The existence of a "blank" character code on any one of the lines 301, 302, 306 and on any one of the lines 304, 305, 307 energizes line 312 to disable AND 321 and to enable AND 322 of switching means 320. Logic 311 is preferably disabled, however, when line 263 signals that recognition unit 150 has already confidently identified the character in stage 213.

Lines 301–305 are also coupled to a conventional dictionary look-up unit 330. Such a unit may contain a table of character codes in a read-only store 331 addressed by the lines 301–305. The resultant full code on line 332 then directly indicates the most probable category for the unknown input character. When AND 322 is enabled, this code is transmitted through OR 323 to output line 308. When AND 322 is disabled, the dictionary output is blocked, while inverter 324 enables AND 321 to pass the code on line 202 to line 308.

Line 308 may be connected either to line 161, FIG. 1, or to still another context-processing unit. The combination of FIGS. 2 and 3 demonstrates how the simpler but reliable dictionary-lookup unit may enhance the more powerful N-gram system 200.

PROCESSOR 400

Figure 4:
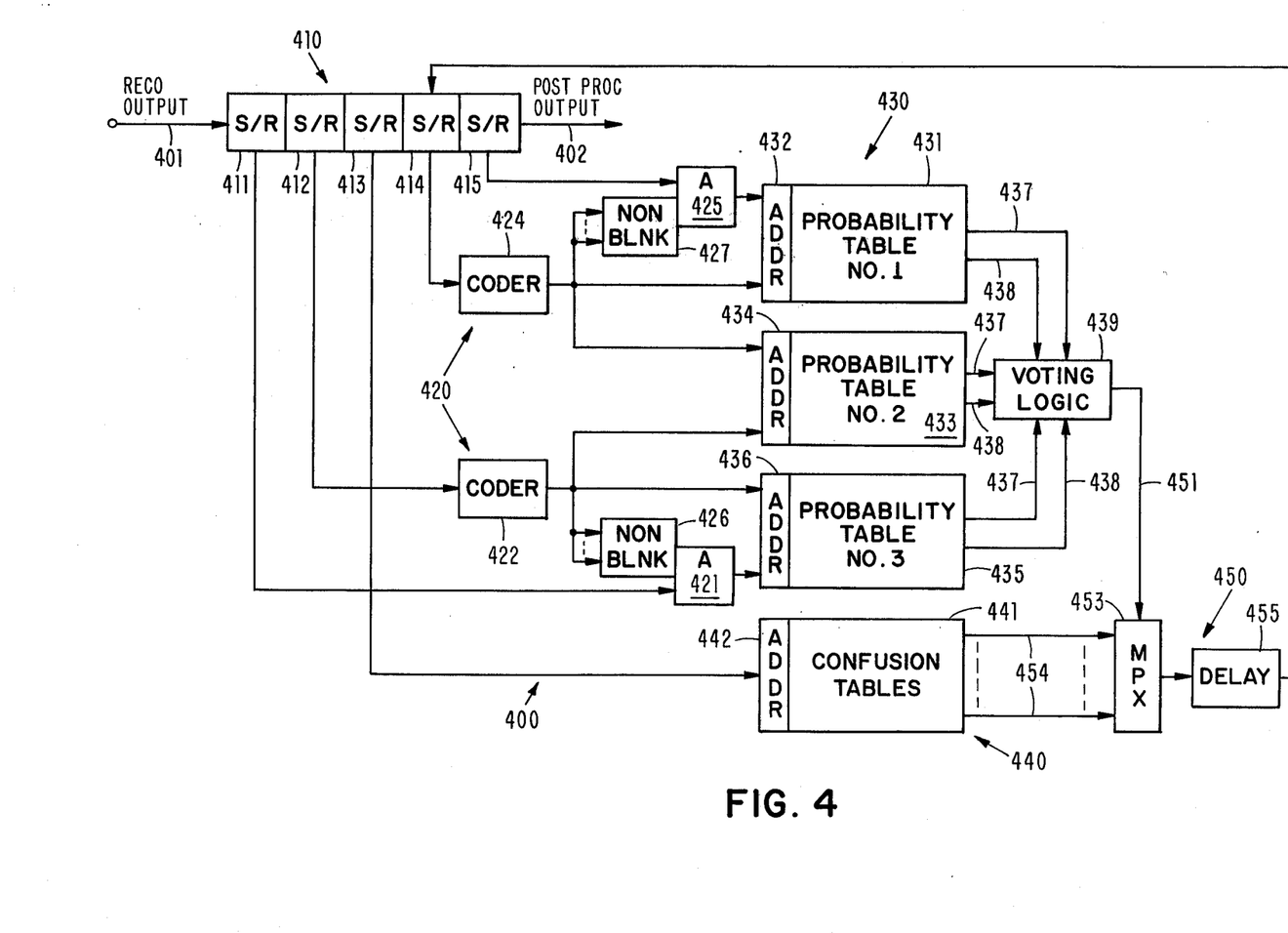
FIG. 4 shows another form of context processor according to the invention.

FIG. 4 shows another context processor 400 for use in system 100. Character codes from recognition unit 150, or from another context processor unit, are received via line 401 in shift register 410. Although the stages 411–415 hold five contiguous characters, the context information used by system 400 comprises three sliding trigrams, rather than a single fixed pentagram. System 400 also employs only partial coding of the characters into sets of categories, since the storage required for three trigrams is much less than that required for one pentagram with any given coding technique.

The first trigram includes the characters in stages 413–415. That is, the first context which is evaluated for the unknown character in stage 413 includes the two characters to its right in the shift register. The context character in stage 414 is transmuted in coding means 420 to a reduced-set code. The context character in stage 415 is not coded into a set, but is conveyed in full through AND 425. This AND gate, however is enabled only when detector 427 perceives that the character in stage 414 is not a blank. This avoids the consideration of extraneous context across work boundaries. The second trigram includes the characters in stages 412–414. In this trigram, the single context characters on both sides of the unknown character are coded into reduced sets by coders 422 and 424. Coders 422 and 424 may be identical to those shown in coding means 220, FIG. 2. The context for the third trigram is the two characters to the left of the unknown character in stage 413. The units 421, 422 and 426 operate similarly to the units 425, 424 and 427 to code the character adjacent the unknown character and to transmit the full code for the farther character, unless it lies beyond a blank. It should be noted here that detectors 426 and 427 actually detect the blank set (a reduced code) rather than the blank character (a full character code). Certain other character categories may be equivalent to a blank for this purpose; in an expanded front, the period, commma, etc. characters may be coded into the same set as the blank character, since these characters also limit the extent of the relevant context.

Context-code generator 430 performs the same overall function as the generator 230 of FIG. 2; that is, it accepts codes representing a number of context characters and emits a reduced code specifying the most probable set in which the unknown character is to be found. Its structure, however, is different. A first read-only store (ROS) 431 is addressed through register 432 by the catenation of a full character code from AND 425, and a reduced code (called a "provisional context code") from coder 424. This provisional code is associated with the first of thee three trigrams. For 27 categories and 6 reduced sets, e.g., ROS 431 may contain 27 $\times$ 6 = 162 addressable entries. In this embodiment, each entry may contain a probability factor associated with the reduced code at that entry.

Coders 422 and 424 address a second ROS 433, via address register 434, for producing another provisional context code for the second trigram. Another probability factor is also read out at the same time. If 6 reduced sets are used, the table in ROS 433 contains 6 $\times$ 6 = 36 entries. The structures of ROS 435 and register 436 are identical to those of the units 431 and 432, although the content and arrangement of the table entries is usually different. That is, if "x", "R" and "C" respectively represent the unknown character, a particular reduced set and a particular character code, then the reduced set to which $x$ belongs is usually different for the combination xRC than it is for the combination CRx. Thus, generator 430 employs a tabular array in ROS units 431, 433 and 435, instead of a single table such as that stored in ROS 232, FIG. 2.

Instead of the single (reduced-set) context code produced by ROS table 232, FIG. 2, ROS tables 431, 433 and 435 produce three provisional context codes on the three lines 437. Voting logic 439 then combines these provisional codes to produce a single best-guess context code on selector line 451. In a system designed for a low substitution rate, logic 439 may simply transmit one of the provisional context codes to line 451 when all three provisional codes are identical, and transmit a reject-set code in all other cases. A two-out-of-three function may also be used, for less stringent applications. The probability factors on lines 439 may also be employed to cause logic 439 to transmit the provisional code having the highest factor, or to transmit that code only when its probability factor is a given amount higher than the next highest probability factor on lines 438. Tables 431, 433 and 435 may also hold multiple provisional codes and probabilities in each entry, with a more complex form of logic 439. Many other algorithms may be selected for voting logic 439, depending upon the particular application at hand.

As was noted in connection with processor 200, the unknown character in stage 413 of register 410 may also be entered into generator 430. Although not shown in FIG. 4, the unknown character may be entered into any of the registers 432, 434 and 436 in either full-code or reduced-code form. More sophisticated coding techniques may also be used. In a 7-gram, for instance the unknown character and its immediate neighbors may be entered in full-code form, while the next neighbor on each side is coded into one of six sets, and the end characters are each coded into one of four sets. This would allow detailed consideration of the immediate context, but the farther context would progressively defocused.

The code for the unknown character is entered into address register 442 of confusion-list generator 440. Generator 440 contains addressable table entries in a ROS 441 to produce a fixed confusion list for each character category, as was done in generator 240, FIG. 2.

Output gating means 450 selects one of the confusion codes in the list produced by unit 440, in accordance with the context code generated by unit 430. More specifically, a conventional multiplexor 453 acts as an electronic multi-position switch to transfer one of the confusion codes on lines 454 to delay units 455. Which of the lines 454 is selected depends upon the context code on line 451. Here again, reject codes may be placed in those list positions of ROS 441 for which no confusion code exists in the corresponding set.

Means 450 also contains facilities for making the processed character available as a context character for later unknown characters. Delay unit 455 retains the selected confusion code until each character code in register 410 has been shifted by the arrival of a new character on line 401. Feedback line 456 then replaced the unknown character, which has moved from stage 413 to 414, with the selected confusion code. This substitution is accomplished before processing is begun on the new unknown character in stage 413. The final output of processor 400 is then taken from shift-register stage 415, via output line 402. Again, line 402 may be connected to another processor or directly to line 161, FIG. 1.

Processor 400 may also employ marker bits or flags to differentiate between confident and non-confident decisions. In the form shown in FIG. 4, however, every character is processed, and no confidence indicator is required. This mode of operation may be used in systems other than those for the machine reading of documents. It is useful, for example, in spelling correction for test-editing and similar systems, or for error correction in digital communications systems. Processors 200 and 400 may be cascaded within the block 160, FIG. 1, to provide two-stage context enhancement.

PREFILTER 500

Figure 5:
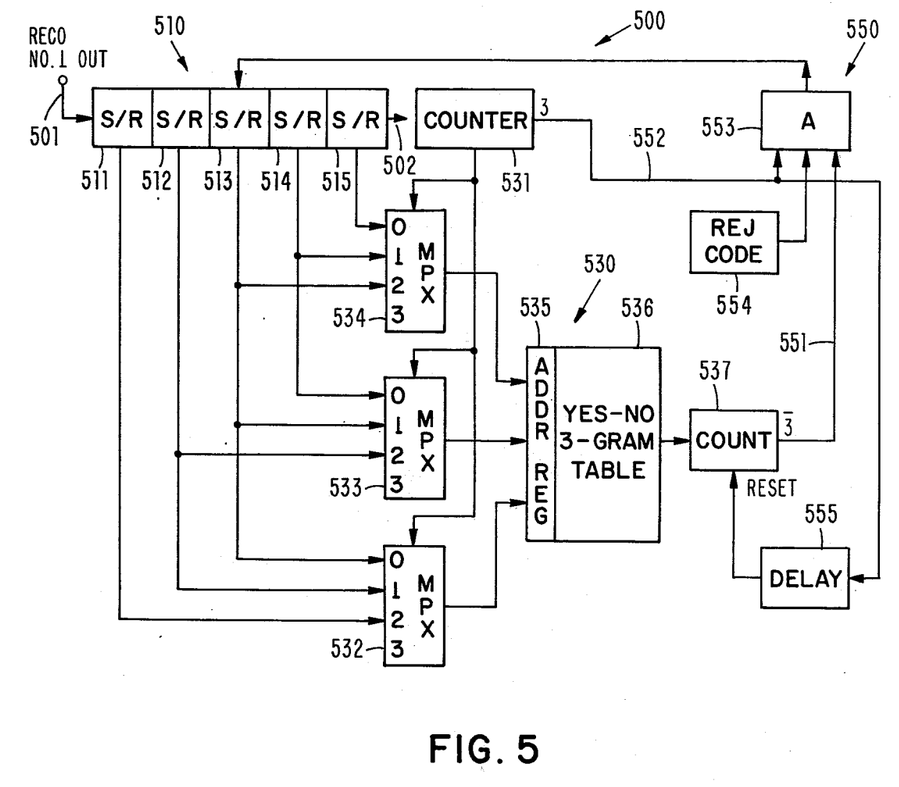
FIG. 5 described a context prefilter useful in conjunction with the invention.

FIG. 5 illustrates an auxiliary prefilter 500 which may be cascaded with either or both of the processors 200 and 400 for further enhancement of their power. Although unit 500 is termed a "prefilter", its input line 501 may be coupled to any of the lines 151, 202 and 402. The purpose of prefilter 500 is to employ full character codes in a very narrow table to detect character sequences whose probability of occurrence is so low that they may be considered to be impossible for all practical purposes. Reference to Table I demonstrates that the majority of all sequences are impossible, even for digrams (N=2). Prefilter 500 employs three sliding trigrams, and rejects a character if any of the trigrams which contain it is impossible.

Full character codes are received one at a time on line 501, and are propagated through the stages 511–515 of a shift register 510. The time interval between successive shifts of register is divided into four subintervals by a clocked counter 531. The unknown character to be processed is located in stage 513. Th first trigram has the unknown character as the first character, the other characters being those located in stages 514 and 515. This trigram is evaluated by consistency generator 530 during subinteval 0 of counter 531, by using the counter output to transmit the characters from stages 513, 514 and 515 through multiplexors 532, 533 and 534 respectively. The multiplexor outputs control address register 535 to select one entry of a table stored in ROS 536. For 27 different categories of input characters, the table requires about twenty thousand entries, but each entry need contain only a single "consistency flag" bit, so that the total amount of storage is relatively modest. A "one" value in the selected entry indicates that the trigram in stages 513–515 is a possible configuration, and increments counter 537. A "zero" bit from the table entry will not increment this counter.

The second trigram considers the characters in stages 512, 513 and 514 during subinterval 1 of counter 531. At this time, the contents of these stages are passed through multiplexors 532, 533 and 534, respectively, to address register 535. ROS 536 then emits another single-bit entry to counter 537 as described above. The third trigram includes the characters in stages 511, 512 and 513 in a similar manner during subinterval 2 of counter 531. All three trigrams may share the same table in ROS 536, since they are all in the same code, and because the unknown character is entered along with the context characters.

Subinterval 3 is employed by output gating means 550. The unused inputs of multiplexors 532–534 show that no data is entered from register 510 at this time. Since all trigrams which include the character in stage 513 have now been tested, counter 537 will contain a count of three only if all three trigrams represent possible character sequences in the language under consideration. The existence of any number other than three produces a signal on line 551. This signal, together with the subinterval-3 signal on line 552, enables AND 553 to replace the contents of stage 513 with a "reject" character code from unit 554, since that character must have been incorrectly identified. Alternatively, if prefilter 500 is to be used in a system employing marker bits for indicating non-confident decisions, unit 554 may be removed, so that AND 553 merely inserts a marker bit into stage 513. It would also be possible to employ prefilter 500 on the characters in a confusion list, by substituting, e.g., the outputs 244–246 sequentially for the output of stage 513. Other uses will also be apparent to those skilled in the art.

The output of prefilter 500 is taken from shift-register stage 515, along line 502. Delay 555 resets counter 537 to zero before the next character arrives on line 501.

Accordingly, prefilter 500 may be seen to be a context technique which is reliable, in that it will reject a valid identification only in the rarest situations. It is not nearly as powerful as either the N-gram processors or the dictionary unit, in that it cannot convert a questionable identification into a confident identification.

CANDIDATE-LIST GENERATOR 600

Figure 6:
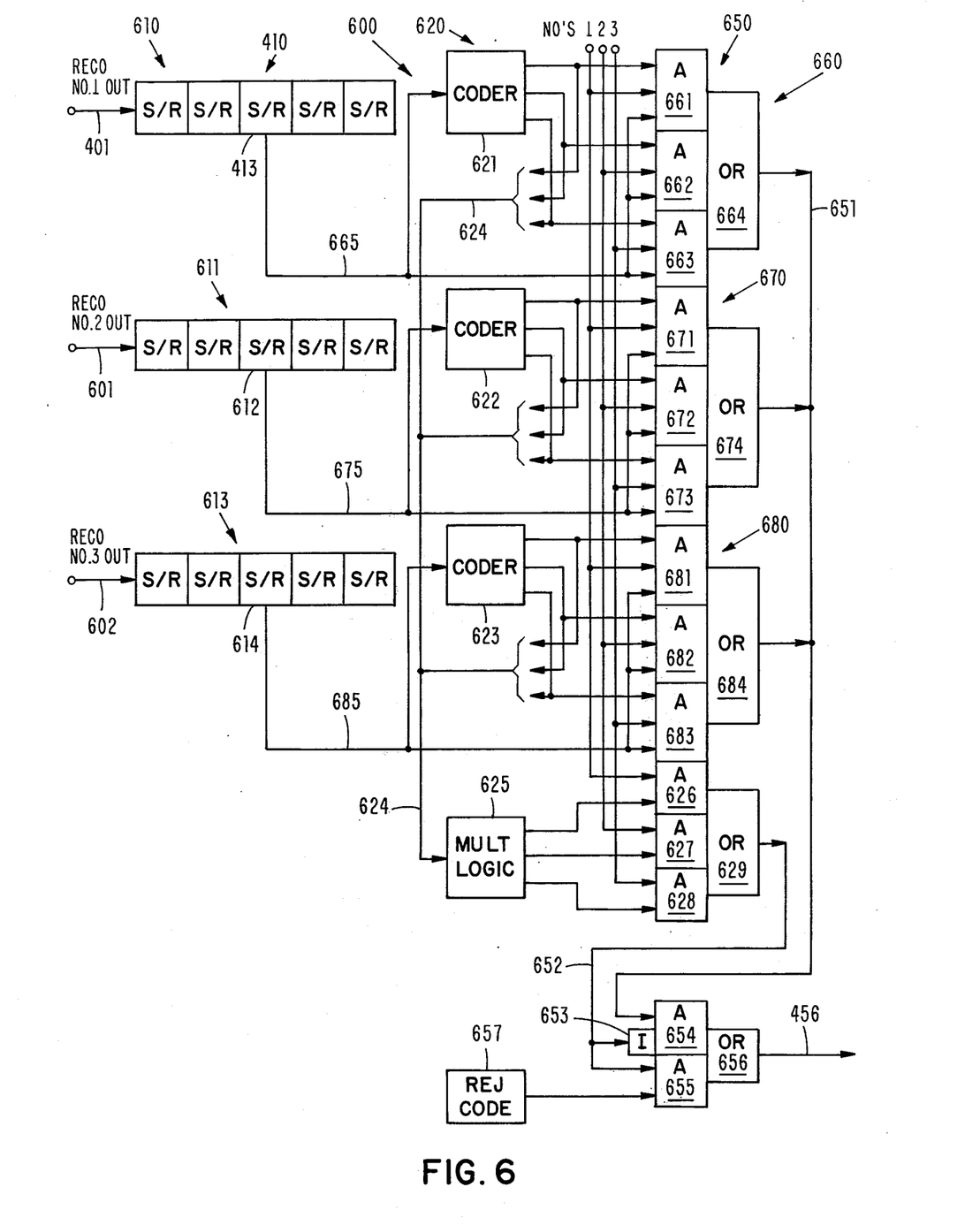
FIG. 6 illustrates a variation of the processor of FIG. 4.

FIG. 6 demonstrates a method of specifying the confusion list, or candidate list, for the unknown character from the character image actually seen by system 100, rather than from a fixed table. List generator 600 is designed to provide this function by replacing the components 441–454 of FIG. 4. The components 401 and 410–415 of FIG. 4 are duplicated in FIG. 6, but not all of the connections thereto are shown.

Some conventional recognition units 150, FIG. 1, derive multiple candidates (this term is more common than "confusion list" in the art) for a single character pattern on document 110. Such a recognition unit is shown in, e.g. U.S. Pat. No. 3,492,646. Instead of resolving these candidates into a final category on the basis of its image alone, the candidate codes may be transmitted to input lines 401, 601 and 602. The size of the list has been limited to three for clarity of explanation. As described in connection with FIG. 4, one candidate for each character is received into and propagated through shift register 410. The other two candidates are received into and propagated through shift registers 611 and 613 in step with the candidates in register 410. The group 610 of shift registers thus receives lists of candidate or confusion-character codes which correspond to the probable categories of the actual patterns seen, rather than to predefined and fixed categories. Reading across each shift register, the stages hold one candidate for each of five different characters on document 110. Reading vertically down the registers in FIG. 6, corresponding stages hold different candidates for the same character on the document. Stages 413, 612 and 614 hold the candidates for the unknown character being evaluated by processor 400.

The candidates in stages 413, 612 and 614 have not necessarily been recognized in a manner such that no more than one in each list belongs to the same reduced set defined by coding means 430. Therefore, coding means 620 separates and arranges the candidates according to these sets. Coding unit 621 translates the character in stage 413 into its reduced code, and includes a decoder which energizes one output line, corresponding to the set of which that character category is a member. For simplicity, output lines are shown for only three of the sets. The outputs of coder 621 are passed to gating means 650, and are also collected into line 624. Coders 622 and 623 perform the same function with respect to the characters in shift-register stages 612 and 614. Their outputs are also collected into line 624. Multiple-candidate logic 625 accepts the nine outputs which have been gathered into line 624, and enables AND 626, 627 or 628 when more than one of the characters lies in a category belonging respectively to the first, second or third predefined set of categories. The occurrence of multiple candidates in the same set is not a problem, however, unless that set has been selected by voting logic 439, FIG. 4. AND 626 therefore transmits no signal through OR 629 when multiple candidates occur in set #1, unless the "set #1" conductor of line 451 indicates that voting logic 439 has selected this set as the context code for the unknown character. AND's 627 and 628 operate similarly with respect to the "set #2" and "set #3" conductors of line 451.

It will be appreciated at this point that the means 610 and 620 together form a means for producing a list of candidate or confusion characters against which the unknown character in shift-register stage 413 may be evaluated.

Output gating means 650 now selects one of these candidates in response to the context code from voting logic 439. Gating unit 660 transmits the character code in stage 413 to line 651 if its category belongs to the set specified by line 451. If the character in stage 413 is in the first set and that set has been selected, the "set #1" conductor of line 451 and the upper output of coder 621 enable AND 661 to pass the code on line 665 through OR 664 to line 651. A confluence of signals on the "set

2" conductor and the middle output of the coder also permit the transmission of the code on line 665 to line 651. Signals on both the "set #3" conductor and the lower output similarly allow the transmission of the code on line 665. In like manner, AND 671, 672 or 673 and OR 674 pass the candidate code on line 675 to line 651 when the category of the candidate in stage 612 is a member of the reduced set specified by line 451. The gates 681-684 convey the code on line 685 to line 651 when the candidate in stage 614 is a member of the specified set. OR gates 664, 674 and 684 are shown separately for ease of illustration; they may actually be a single nine-way OR of sufficient width to pass a character code.

When only one of the candidates has a category in the selected set of categories, only one of the AND's 661-663, 671-673 and 681-683 can be simultaneously enabled, so that only a single code appears on line 651. When multiple candidates occur in the selected set, however, their codes will overwrite each other and produce incorrect results. Control line 652 prevents such an untoward event from propagating to output line 456. Under normal conditions, control line 652 is inactive, so that inverter 653 enables AND 654 to pass the code on line 651 through OR to line 456. But, as described above, the detection of multiple candidates in the same set causes OR 629 to energize control line 652. This then disables AND 654, and enables AND 655 to place a "reject" symbol code from unit 657 on line 456. The use of a "reject" code under the foregoing condition is strictly necessary only when no additional information is available as to the relative merits of the candidates. For example, if recognition unit 150 always enters the most confident candidate in register 410, the next in register 611, etc., then logic 625 and gating means may be supplemented by means (not shown) to choose the most confident candidate in the set selected by line 451. This result could also be achieved by presenting marker bits or other confidence data along with the candidate codes.

Other variations on the theme of FIG. 6 will also be apparent to those skilled in the art. Recognition unit 150 may be designed, for instance, to place a special code in stages 612 and 614 when it has confidently categorized the character in stage 413. Gating means 650 could then respond to this code by placing the character code in stage 413 directly onto output line 456. Coding means 620 may be positioned ahead of receiving means 610, or even built into recognition unit 150, so that each register 410, 611 and 613 would each contain only those candidates in a single one of the reduced sets. Gating units 660-680 could then be replaced by a multiplexor such as that shown at 453, FIG. 4. Generator 600 may also, of course, be adapted for use with processor 200, FIG. 2.

PROCESSING ROUTINE 700

Figure 7:
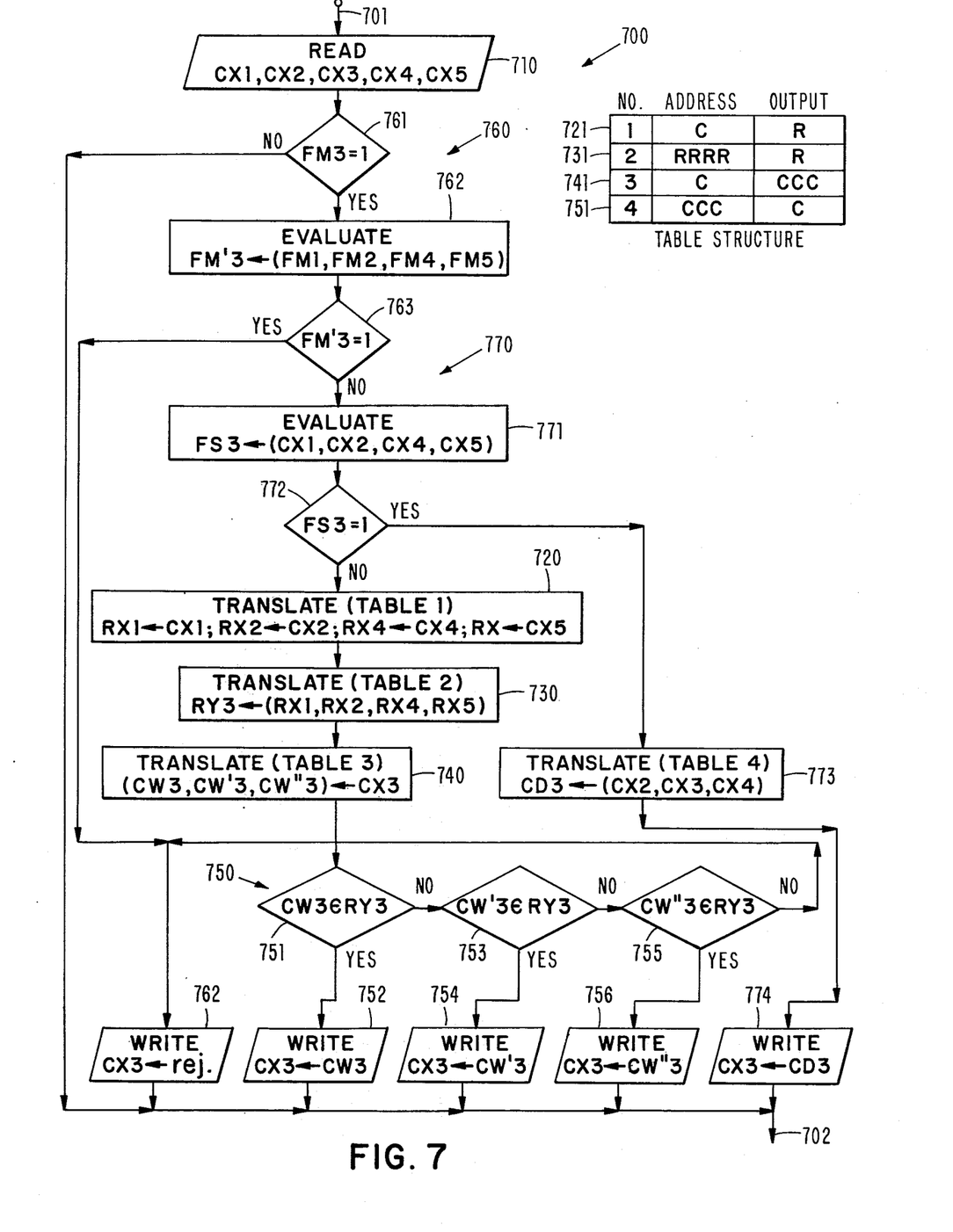
FIG. 7 shows one form in which the invention may be programmed for execution on a digital computer.

Contextual processing according to the invention may also be carried out by programming a general-purpose digital computer. FIG. 7 shows the flowchart of a routine 700 for performing the invention in this manner.

Each code named in FIG. 7 (as well as in FIGS. 8 and 9) follows the same format, for ease of exposition. The first letter of the code name is a letter indicating its type. The letter C indicates a code representing one of the possible character categories; e.g., the character "Q" may have a category code of "1000 1101" in binary notation. All forms of a character belonging to the same category are normally represented by the same code in any type of digital machine. Hence, the terms "character" and "category" are effectively synonymous; any character "Q" has a category which is also called "Q", and the code representation is the same for both. Character codes normally have five to eight bits, allowing the representation of from 32 to 256 different categories. In a digital computer, character representations are normally specified in terms of a standard form, such as EBCDIC or ASCII. The initial letter R in a code indicates that that code represents one of the previously described sets of categories. Again the name of a set is indistinguishable from the code used to represent that set; the terms "set" (or "reduced set") and "reduced code" thus have the same significance. Reduced codes preferably contain two or three bits, permitting the representation of four to eight separate sets. The sets are arbitrarily assignable to the different reduced codes. The various character categories may be assigned among the different sets as shown in Table II. The initial letter F in a code indicates a flag or status code. Since a flag usually has only two possible values, a single bit suffices for its representation. The initial letter P represents a (numerical) probability code. The space required for such a code may vary considerably, but two to six bits is normally sufficient for the present purposes.

The second letter of each code designation specifies the function of the code within the invention; it does not affect the structure of the code. The prime marks which may follow the second letter further particularize those codes having the same general function. Finally, the number at the end of each code specifies the association of the code with a particular character in the group of characters under consideration. In the present illustration, character #1 may correspond to the character in shift-register stage 211 (FIG. 2), 411 (FIG. 4) or 511 (FIG. 5); character #2 may correspond to that in stage 212, 412, or 512, and so forth.

Thus, for instance, the designation "RY3" signifies the context code, since this code is a reduced code having a particular function and associated with the third character in the illustrative group of five characters under consideration. A particular value of any code is represented by one or more numerals or lower-case letters. The designation "FM3=1", for example, indicates that the marker flag associated with the third character has a binary value of "1", while "CX3 ← rej." means that a "rejected" code value such as binary "1111 1111" replaces the catagory code of the third input character.

Routine 700, beginning at entry point 701, considers five input characters CX1-CX5 in order to establish or enhance the identification of the unknown character CX3. After step 710 reads in these five codes (including their marker flags FM1-FM5) from unit 150, FIG. 1, decision step 761 of confidence-level subroutine 760 determines whether the marker flag FM3 has the value "1", indicating that character #3 has been non-confidently identified by unit 150. If the identification was confident, step 761 causes a branch to exit point 702. This leaves the value of CX3 unchanged. But, if the decision was not confidently made, block 762 assigns a value to a flag FM'3 by evaluating a predetermined function of the flags FM1, FM2, FM4 and FM5. FM3 need not be employed here as its value is already known from block 761. The particular function used may be any of those described in connection with logic 261, FIG. 2. If FM'3=1, the context is unreliable and block 763 causes a branch to block 764, which substitutes a "reject" code for CX3, and exits at point 702.

When the context is sufficiently reliable, step 771 of dictionary look-up subroutine 770 evaluates a space flag FS3 from the input character codes CX1, CX2, CX4 and CX5. The value of this flag is "1" if CX3 is part of a small word, and is "0" otherwise. Decision step 772 branches to translation step 773 for FS3=1. Block 773 addresses a table 774 by catenating the codes CX2, CX3, and CX4. Each addressable entry in table 774 contains a single character code CD3, which identifies the most probable category for the input character CX3 is the context CX2, CX4. Only the code format is shown in the table structure at 774; that is, the address of the table is formed from three full character codes, and each entry outputs one full character code. This abbreviation demonstrates more clearly that if, e.g., each character code contains five bits, then the address has a length of fifteen bits, and each of the entries has five bits (i.e., the table has a width of five bits). Table 774 is capable of processing words having fewer than three letters, since the "blank" is also a valid character code. The dictionary entry CD3 replaces the input character CX3 in step 775. In this way, the simple and reliable dictionary enhances the more powerful N-gram processor.

If the character CX3 is not part of a small word, decision block 772 passes control to block 720, which translates each of the context characters CX1, CX2, CX4, CX4 into a reduced code RX1, RX2, RX4, RX5 representing the sets to which the respective input character categories belong. These sets may be defined as shown in Table II hereinabove. The table 721 used for translation 720 is thus addressed by a full character code C and outputs an entry containing a reduced code R. For six sets of 27 categories, table 721 requires 162 entries and is three bits wide. Block 730 then translates reduced codes RX1, RX2, RX4 and RX5 into a context code RY3 in the reduced format. This translation may be accomplished by addressing table 731 with the catenation of the four reduced codes, and reading out the single reduced code contained in the addressed entry.

Step 740 generates a fixed confusion list of full character codes CW3, CW'3, CW"3 which have been predefined for each possible category of the input character CX3. This function is preferably performed in a table 741 which is shown as containing entries each having three catenated character codes and addressed by a single character code. It should be noted that the confusion list for a character category includes that category itself as a member. That is, the list for the character "T" in Table I is "T,I,Y", and not merely "I,Y". If this were not the case, a tentative identification by recognition unit 150 could never be confirmed as being correct.

Subroutine 750 evaluates the confusion list against the set selected in step 730 to output the correct code for the input character CX3. Step 751 first inquires whether the category specified by the first confusion code CW3 is a member of (written "$\epsilon$") the selected set represented by context code RY3. If so, block 752 replaces the value of the code CX3 with the value of the code CW3. If not, decision block 753 determines whether the category of the second confusion character CW'3 is included in the set RY3. If so, step 754 replaces the code CX3 with the code CW'3. If not, block 755 tests whether the third confusion character CW"3 is included in context code RY3. If so, block 756 writes CW"3 into CX3. Each of the blocks 752, 754 and 756 leads to exit point 702.

PROCESSING ROUTINE 800

Figure 8:
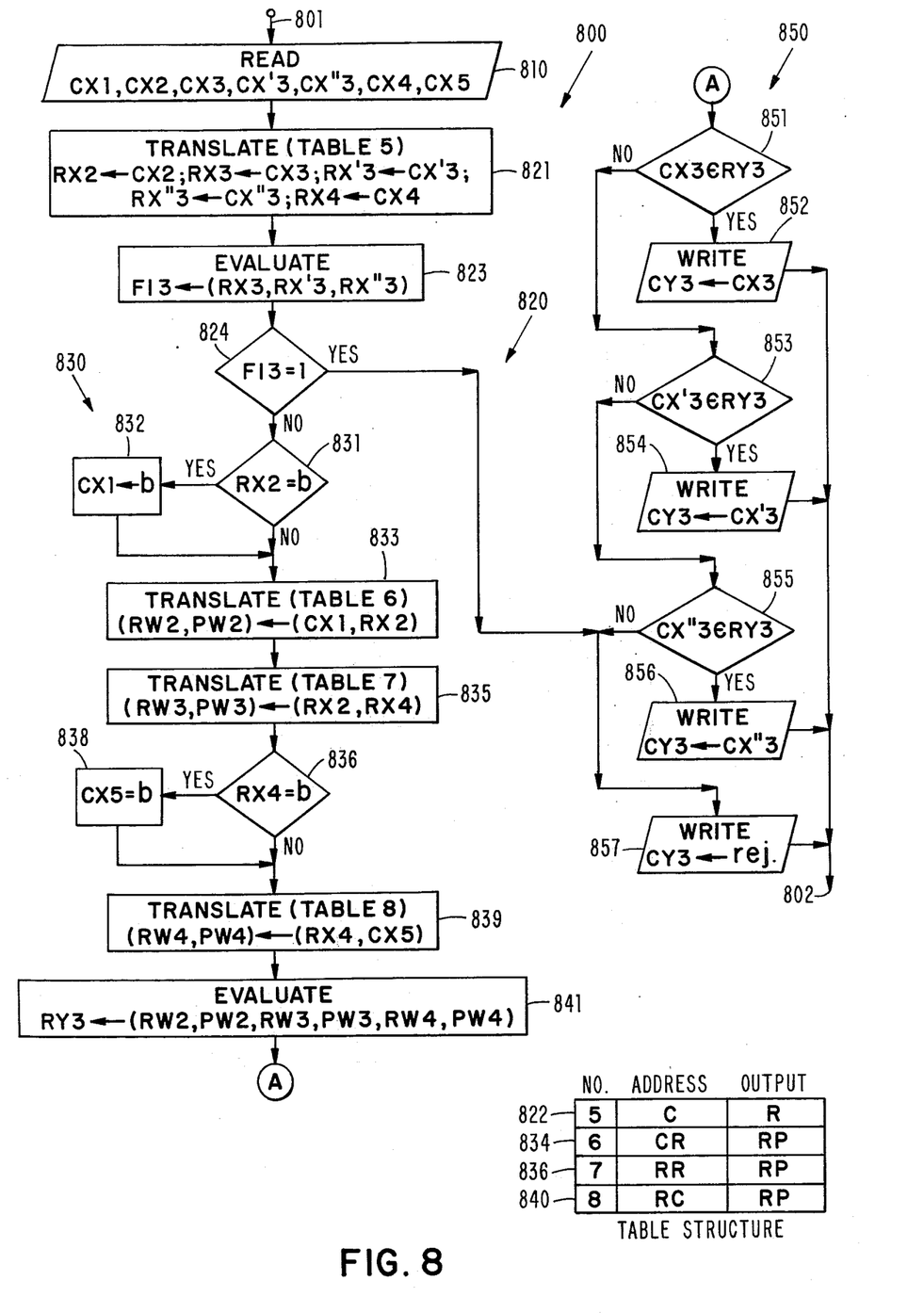
FIG. 8 shows another method of programming the invention for a digital computer.

Routine 800, FIG. 8, is another implementation for a contextual processing method according to the present invention. Entering at point 801, routine 800 first receives a group of input characters from a recognition unit 150 which is designed to produce multiple candidates for each character. In addition to reading the character codes CX1–CX5, step 810 therefore also reads in the second and third candidates CX'3 and CX"3; CX3 is itself the first candidate. Thus, step 810 performs the dual function of receiving the context characters and specifying the list of candidate or confusion characters for routine 800.

Coding subroutine 820 also performs two functions. Step 821 first translates CX2 and CX4 into the corresponding reduced codes RX2 and RX4 for use by subroutine 830, to be described below. Step 821 also translates the three candidates CX3, CX'3 and CX"3 into their corresponding reduced codes RX3, RX'3 and RX"3, for detecting a conflict condition. Table 822 may be used for both functions, since the entries at corresponding addresses are the same for both uses. Step 823 then evaluates a function of these reduced codes to produce a value for conflict flag FI3. The function executed by block 823 may be any of those described in connection with voting logic 439, FIG. 4. Although not shown in FIG. 8, block 823 may be relocated to follow step 841, so that context code RY3 could also be employed in evaluating FI3. Decision step 824 causes a branch to step 857 when FI3 indicates that a conflict between multiple candidates in the same reduced set cannot be resolved. Otherwise, control is passed to step 831.

Context-code generating subroutine 830 begins with a test for a blank, "$b$", in the position occupied by input character CX2. The actual condition used is RX2=$b$ rather than CX2=$b$, since it may be desirable to code periods, commas, etc. into the same reduced set as the blank character for this purpose. If step 831 detects a blank, step 832 replaces the CX1 code with the value for a blank character category, and continues to step 833. This alteration in the value of CX1 will not be a problem during the processing of further characters, since step 810 will read in the correct code from recognition unit 150 in the next pass through routine 800. Step 833 follows step 831 or 832, and produces both a provisional context code RW2 and a probability factor PW2 from the uncoded character CX1 and the reduced code RX2. Provisional code RW2 represents the most probable set for CX3, based upon the trigram centered on CX2. Step 833 may be accomplished by a translation involving a table 834 addressed by the catenation of a full character code and a reduced code. As shown, the addressed entry outputs a reduced code and a numerical probability value associated therewith.

Step 835 next produces the codes RW3, PW3 for the trigram centered on CX3. Table 836 is addressed in this case by two reduced codes. Steps 837 and 838 perform the same functions as blocks 831 and 832, with respect to the codes RX4 and CX5 instead of RX2 and CX1. That is, the context characters on the far side of a blank in either direction are considered to be extraneous to the identification of CX3. Step 839 then produces provisional context code RW4 and probability PW4 in the same manner in which step 833 produces RW2 and PW2. Translation table 840 for step 839 must contain different entries than those of table 834, as was explained in connection with ROS units 431 and 435 of FIG. 4. The entry emitted by table 840 specifies the most likely reduced set (and its probability value) for input character CX3, based upon the trigram centered on CX4. That is, routine 800 employs three sliding trigrams and a tabular array 834, 836, 840, instead of the single fixed pentagram and single table 731 of routine 700. Finally, step 841 of subroutine 830 produces the final context code RY3 as a predetermined function of the three provisional codes RW2, RW3, RW4, and of their probabilities PW2, PW3, PW4. The exact function employed in step 841 will vary, but may conform to any of those described in connection with voting logic 439, FIG. 4.

It remains to select that candidate from the list CX3, CX'3, CX"3 which is a member of the set designated by the context code RY3. To this end, step 851 of subroutine 850 first tests the category of CX3 for membership in the set specified by RY3. If CX3 is a member of this set, its value is assigned to the output character CY3 in step 852. Otherwise, step 853 tests the second candidate CX'3 for membership in the reduced set RY3. If this relationship is satisfied, step 854 writes the value of CX'3 into CY3. If not, step 853 branches to decision step 855. The inclusion of the third candidate CX"3 in RY3 then causes block 856 to write CX"3 into CY3, while the opposite condition causes a branch to step 857. When none of the candidates lies within the selected set RY3, step 857 outputs the "reject" code as CY3. Blocks 852, 854, 856 and 857 all lead to the exit point 802 of routine 800.

Routine 800, unlike routine 700, does not re-enter the output character CY3 into the input character sequence CX1–CX5. This function may obviously be performed in routine 800 if desired. Many other variations, such as those discussed in connection with FIGS. 2–7, will also be obvious to those skilled in the art.

PREFILTERING ROUTINE 900

Figure 9:
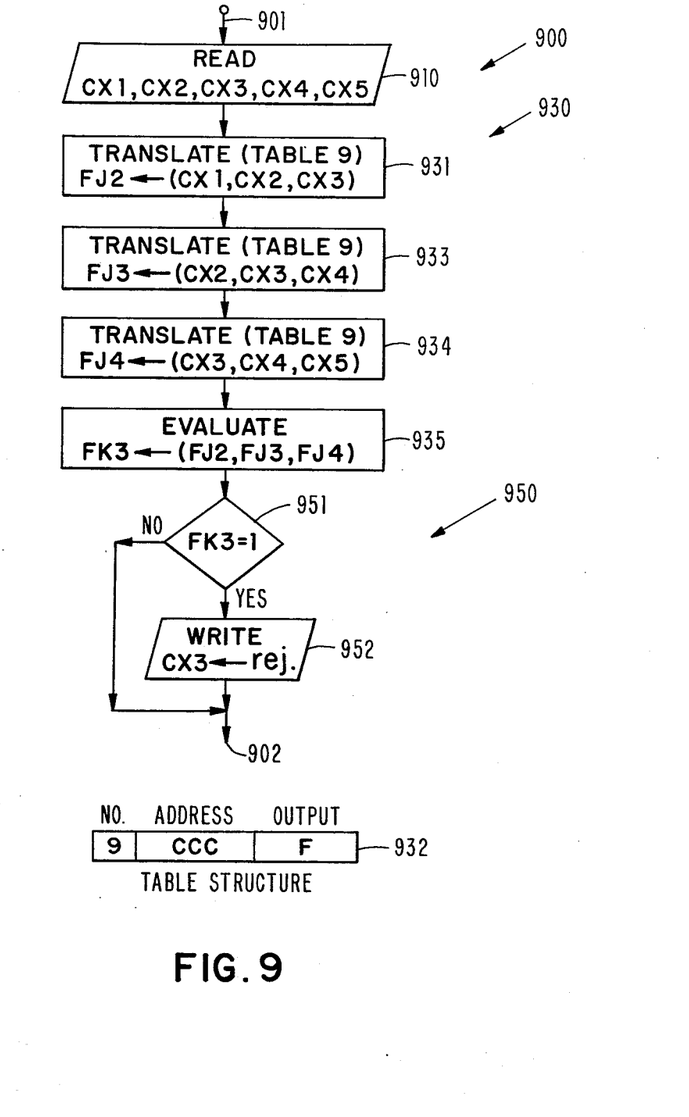
FIG. 9 illustrates programming for a context prefilter useful with the invention.

Routine 900, FIG. 9, is essentially a programmed implementation of the hard-wired prefilter 500, FIG. 5. Routine 900 may be employed with routine 700 or 800, or as a programmed adjunct to the processors shown in FIGS. 2 and 4. Like filter 500, routine 900 is not sufficient for use by itself. Its reliability, however, increases the overall reliability of a context system which employs it in conjunction with a more powerful method of analysis.

Following entry point 901, step 910 receives the input character codes CX1–CX5 to determine whether the character CX3 has a significant probability of being incorrect. Coding subroutine 930 translates each trigram containing CX3 into a flag indicating whether or not CX3 may be incorrect, based on those three characters. Step 931 first translates the trigram which includes CX1–CX3 into a binary consistency flag FJ2. The translation is accomplished by addressing a table 932 with three catenated character codes. This table need only be one bit wide, since FJ2 has only two possible values. Next, step 933 translates the trigram centered on CX3, and including CX2–CX4, into another binary consistency flag FJ3. Finally, block 934 converts the trigram centered on CX4 into a third binary flag FJ4. Steps 931, 933 and 934 all employ the same table 932.

Each of the flags FJ2–FJ4 indicates whether the category of character CX3 has some minimal probability of occurrence in one of the above trigrams. Step 935 then combines these flags to derive a binary flag FK3 indicating whether the given CX3 is in fact possible in all three of the trigrams. Output subroutine 950 ultimately determines the code to be assigned to CX3. If step 951 does not detect the condition FK3=1, then this category is possible in all of the trigrams, and the CX3 code is passed to exit point 902 unchanged. But, if FK3=1, the category is improbable in at least one trigram, and step 952 therefore assigns a "reject" code to CX3 before exiting at point 902.

SYSTEM INTERCONNECTIONS

FIGS. 2, 4, 6, 7 and 8 show individual implementations of context-aided recognition methods according to the invention. FIGS. 3, 5, 7 and 9 illustrate context methods which are conventional in themselves, but which are useful in conjunction with the inventive methods. Various interconnections of these methods have been described.

The method of interconnecting the methods into a system such as shown in block 160, FIG. 1, is also part of the present invention. Just as there is a trade-off between reject rates and substitution rates in a recognition unit, context processing involves a trade-off between power and reliability; i.e., between the ability to make a context-aided identification and the accuracy of the decision. It has been discovered, however, that both the power and the reliability of an overall context-aided recognition system can be increased, without an equal increase in cost, by the concurrent use of a very reliable contextual method with a very powerful contextual method.

The reliable method need not be especially powerful, as is true of the unit 500 and the routine 900; it need not be sufficiently general to even attempt a decision in all cases, as shown by unit 300 and subroutine 770. The powerful method, on the other hand, need not be as reliable as the illustrative examples shown in FIGS. 2, 4, 6, 7 and 8. It may afford to destroy some contextual information, for example, in order to consider a greater number of context characters, since many possibilities for incorrect decisions are previously or subsequently eliminated. Although a large-word dictionary processor may be less accurate in providing a correct overall match between an input word and a dictionary word, the detection of improbable trigrams or pentagrams from the input word, by a binary prefilter such as 500 or 900, reduces the possibility of incorrect matches in the dictionary.

This synergistic use of multiple context methods indicates that the reliability and accuracy requirements of many general-purpose and powerful methods are no longer as important as heretofore believed. Conversely, even relatively simple methods which are known to be very accurate and reliable, may now be employed without undue regard for their comprehensiveness or generality. A simple example of the latter type of method is a source of format information in recognition unit 150 or in CPU 170, FIG. 1. If it is known, for instance, that system 100 is reading a numeric field on document 110, then the processor of FIG. 2, e.g., need not decide such conflicts as 2-Z, 5-S, 6-G and 8-B between letters and numerals.

Having described several embodiments thereof, I claim as my invention:

1. A system for enhancing the recognition of characters, comprising:

recognition means responsive to a sequence of character patterns for producing a sequence of character codes identifying said characters with respect to a predetermined plurality of categories;

coding means coupled to said recognition means for translating a plurality of said character codes to a plurality of reduced codes corresponding to a plurality of sets of said categories, the number of said sets being substantially smaller than the number of said categories;

first storage means responsive to said reduced codes for producing a context code representing one set of said categories;

second storage means for holding a plurality of confusion codes associated with a predetermined one of said character codes, each of said confusion codes identifying one of said categories; and gating means responsive to said context code for selecting one of said confusion codes.

2. The system of claim 1 wherein said recognition means is further adapted to produce a marker flag associated with a non-confident one of said character codes; and wherein said gating means is further responsive to the absence of said marker flag for inhibiting said one confusion code.

3. The system of claim 1, wherein said recognition means is further adapted to produce marker flags associated with non-confident ones of said character codes; and wherein said gating means is further responsive to a predetermined combination of said marker flags for selecting a reject code and inhibiting said one confusion code.

4. The system of claim 1, wherein said first storage means comprises a storage array for producing a plurality of provisional codes, and logic means for selecting one of said provisional codes as said context code.

5. The system of claim 4, wherein said gating means is coupled to said logic means for substituting a reject code for said context code when said provisional codes bear a predetermined relationship with one another.

6. The system of claim 1, further comprising feedback means for substituting said one confusion code for a predetermined one of said character code in said sequence.

7. The system of claim 1, further comprising:

third storage means responsive to a plurality of said character codes for producing flags for predetermined combinations of said character codes; and means responsive to said flags for modifying one of said character codes.

8. The system of claim 1, further comprising:

dictionary means responsive to a plurality of said character codes for producing a further character code;

detecting means responsive to a predetermined combination of said character codes for producing a small-word flag; and means coupled to said detecting means for substituting said further character code for said one confusion code.

* * * * *